United States Patent
Martin

(10) Patent No.: US 7,258,369 B2
(45) Date of Patent: Aug. 21, 2007

(54) MULTICOUPLING DEVICE

(75) Inventor: Dietmar Martin, Braz (AT)

(73) Assignee: Josef Martin GmbH & Co. KG, Braz (AT)

( * ) Notice: Subject to any disclaimer, the term of this patent is extended or adjusted under 35 U.S.C. 154(b) by 211 days.

(21) Appl. No.: 10/530,102

(22) PCT Filed: Oct. 1, 2003

(86) PCT No.: PCT/EP03/10876

§ 371 (c)(1),
(2), (4) Date: Apr. 1, 2005

(87) PCT Pub. No.: WO2004/031637

PCT Pub. Date: Apr. 15, 2004

(65) Prior Publication Data

US 2005/0285390 A1   Dec. 29, 2005

(30) Foreign Application Priority Data

Oct. 1, 2002 (DE) ................... 102 45 742

(51) Int. Cl.
*F16L 39/00* (2006.01)
(52) U.S. Cl. ............... 285/124.5; 285/124.4; 285/38; 285/26
(58) Field of Classification Search ........... 285/124.4, 285/124.5, 124.3, 124.2, 124.1, 38, 26
See application file for complete search history.

(56) References Cited

U.S. PATENT DOCUMENTS

| 3,527,480 A | | 9/1970 | Larson |
| 4,615,546 A | | 10/1986 | Nash et al. |
| 5,316,347 A | | 5/1994 | Arosio |
| 5,464,042 A | * | 11/1995 | Haunhorst ............ 137/595 |
| 5,507,530 A | | 4/1996 | Mahaney |
| 5,816,621 A | * | 10/1998 | Frost ............ 285/1 |
| 5,984,371 A | * | 11/1999 | Mailleux ............ 285/26 |
| 5,988,697 A | * | 11/1999 | Arosio ............ 285/124.1 |
| 6,443,498 B1 | * | 9/2002 | Liao ............ 285/124.1 |
| 7,021,668 B2 | * | 4/2006 | Langenfeld et al. ........ 285/38 |

FOREIGN PATENT DOCUMENTS

| DE | 2 142 690 | 3/1973 |
| EP | 0 390 715 | 10/1990 |
| WO | WO 01/50057 | 7/2001 |

* cited by examiner

*Primary Examiner*—David Bochna
(74) *Attorney, Agent, or Firm*—Volpe and Koenig, P.C.

(57) ABSTRACT

A multicoupling device for lines, especially hydraulic lines, wherein first and second coupling parts (7, 8) are provided with a plug (5) or a collar (6) for coupling units (1, 2) whose number corresponds to the number of connections to be produced. The coupling units (1, 2) are embodied in the form of a self-locking, snap coupling with a locking collar (9) which can be displaced in relation to the socket (6). The two coupling parts (7, 8) can be brought together via an operating element (10) and can be pressed apart and are mutually lockable in the coupling position. The locking collars (9) interact with a common switch plate (11). The operating element (10) is rotatably mounted on an axis (12) on the switch plate (11). The switch plate (11) can be adjusted in relation to one of the two coupling parts (7, 8) in the direction of closure or opening of the coupling units (1, 2). The two coupling parts (7, 8) can be moved by the operating element (10), which is mounted on the switch plate (11), by engagement with curved engagement slots with pins (14) that protrude from the other coupling part, in relation to each other in a closing and opening position.

13 Claims, 2 Drawing Sheets

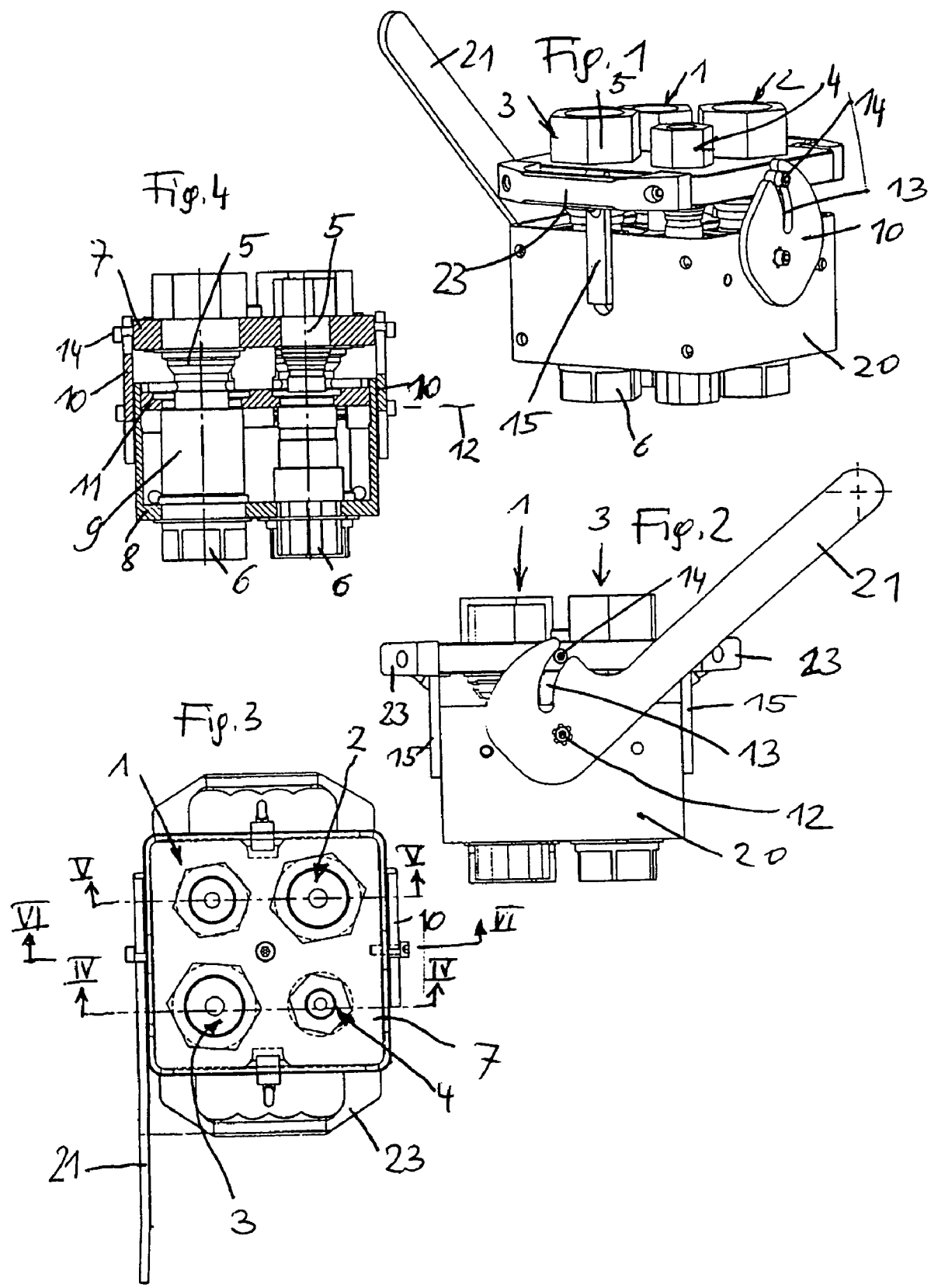

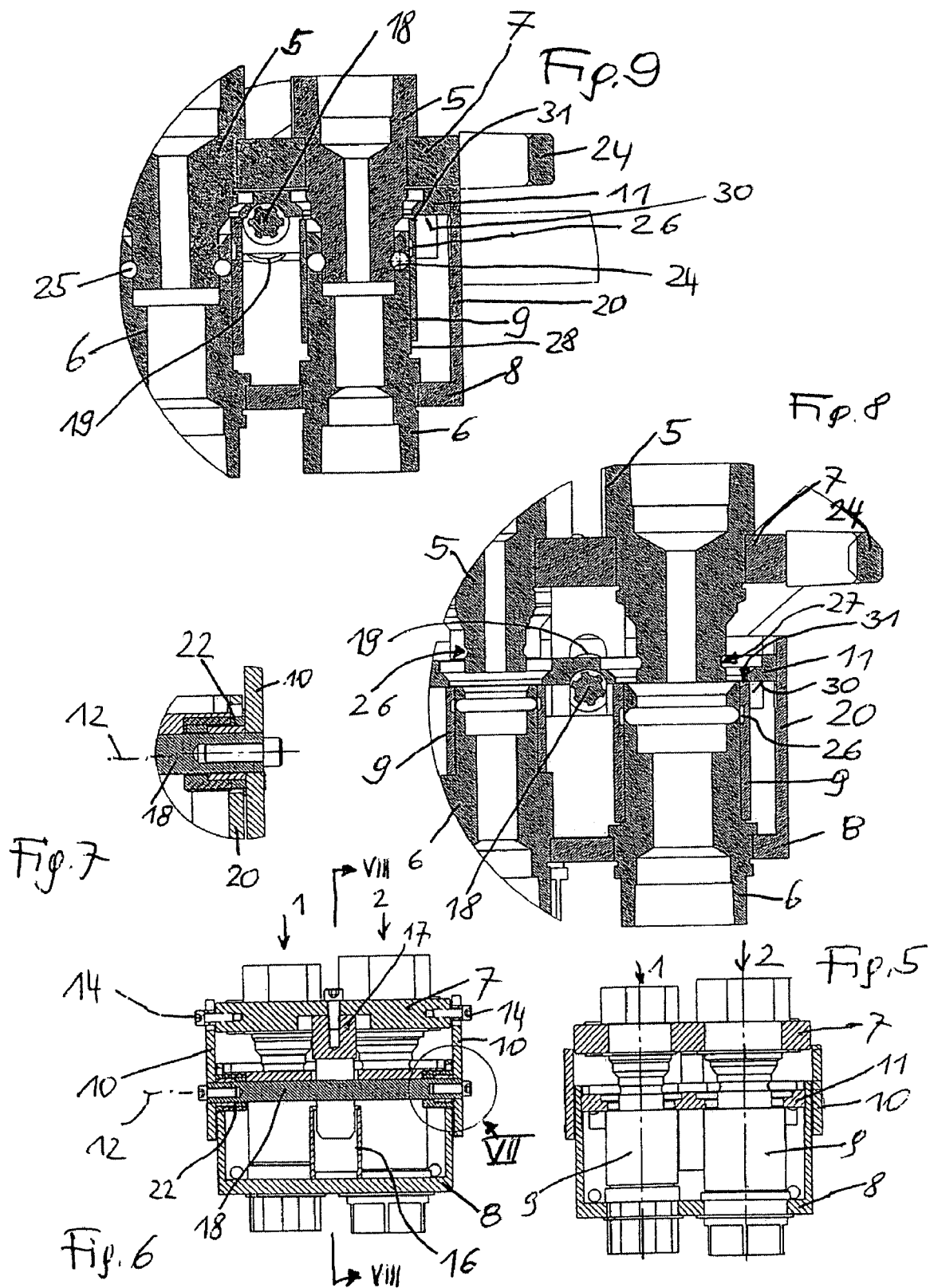

MULTICOUPLING DEVICE

BACKGROUND

The invention relates to a multicoupling device for lines, especially hydraulic lines, with coupling units, which are provided in a number corresponding to the number of connections to be produced and which each have a plug and a socket that receives the plug, and with first and second coupling parts. Here, the plug is mounted on one of these coupling parts and the socket of a corresponding coupling unit is mounted on the other of these coupling parts, with the coupling units being embodied as self-locking snap couplings, whose sockets each have a locking collar that can be displaced in relation to the socket. The two coupling parts can be brought together by means of operating elements and can be pressed apart and fixed relative to each other in the coupling position. The locking collars of the corresponding coupling unit interact with a switch plate, which is common for all of the coupling units and which lies between the two coupling parts. The switch plate can be adjusted in relation to one coupling part in the closing or opening direction of the coupling units. The two coupling parts can be moved in relation to each other by at least one operating element mounted on the switch plate by engagement via at least one curved engagement slot and a pin formed on the other coupling part into a closed and open position and can be mutually locked in their closed position.

Such multicoupling devices for connecting and disconnecting several pairs of hydraulic lines are known. These multicoupling devices are used especially such that the individual hydraulic lines cannot be connected to each other incorrectly. For this purpose, the first and second coupling parts are embodied such that these coupling parts can be brought together in a way that the plugs and the sockets of the individual coupling units can be connected only when the two coupling parts are in alignment.

In order to fix the two coupling parts in the brought-together position, in which the plugs and the sockets of the individual coupling units are connected to each other, the known multicoupling devices have mechanical connecting elements between the first and the second coupling part. For example, a known multicoupling device uses a connecting link guide for this purpose. Here, one of the coupling parts has plates, which are connected to two sides of this coupling part by means of a swivel pin and which can be turned by a lever. Each of these plates has a curved slot beginning at the side edge of the plate. The distance of the slot from the swivel pin decreases along the course of the slot. On the other coupling part, there are two pegs spaced apart laterally. By bringing the two coupling parts together until the pegs lie in the beginning regions of the slots, and then through subsequent pivoting of the swiveling lever, the two coupling parts are brought into complete engagement of the corresponding plugs in the sockets relative to each other and locked in this position. The force exerted by the two coupling parts on the mechanical connecting elements in the closed state of the multicoupling device corresponds to the sum of the forces exerted by the individual coupling units due to the pressure of the hydraulic oil. Due to the limit on the forces that can be received by the mechanical connecting elements, the permissible pressures in the individual hydraulic lines are limited to a relatively low value.

Various structural configurations of such multicoupling devices are known, for example, from U.S. Pat. No. 5,316,347, U.S. Pat. No. 5,507,530, and U.S. Pat. No. 4,615,546. Furthermore, in another known configuration (U.S. Pat. No. 3,527,480), a displaceable locking collar is arranged on the socket, with this locking collar then being connected rigidly to a coupling part. However, during the insertion process into the socket, there is no special holder for the plug itself and thus exact alignment is not guaranteed.

Furthermore, a configuration has become known (EP-A-0390715), in which the plug, the socket, and a locking collar are each connected rigidly to a coupling part, which requires a rather complicated connecting link control in order to move these coupling parts in relation to each other and to mutually lock these parts against shifting at the end.

Furthermore, from WO 01/50057, a multicoupling device is known, in which the coupling units are embodied as self-locking snap couplings, whose sockets each have a locking collar displaceable in relation to the socket for opening the snap coupling. Here, the locking collar of the socket of a corresponding coupling unit is mounted on the first or second coupling part and the socket body can be displaced in the longitudinal direction in relation to this coupling part. The locking collar is surrounded by an attachment socket, which is fixed in the first or second coupling part, preferably screwed into this coupling part. The locking collar is thus covered from the outside and can be moved only when one of the two coupling parts moves to a point where disengaging is possible.

SUMMARY

The objective of the present invention is to provide a multicoupling device of the type mentioned in the introduction such that in a simple way the locking collars of all of the coupling units that are used are secured in the closed position and also such that unlocking can be performed in a simple way.

This is achieved according to the invention in that the operating element is held on the switch plate so that it can rotate about an axis running parallel to the plane of this switch plate, in that the axis for holding the operating element is formed by a shaft mounted in the switch plate or by two shaft stumps, in that the shaft engages in an elongated hole in a wall part of one coupling part in the region between the switch plate and the operating elements, and in that the switch plate can move independent of the locking collars.

Through these measures according to the invention, in the open position of the coupling units, the locking collars are always in the position, in which the plug and socket can be brought together. In a simpler way, the freedom of movement of the locking collar is then reduced by the switch plate projecting at one end of the locking collar. Thus, there is no need for direct, rigid mechanical connection between the switch plate and the locking collars.

However, in this way the structural design of the entire multicoupling device also becomes simpler, more secure, and less susceptible to disruption. Through the arrangement of the rotating axis of the operating elements in a switch plate lying between the coupling parts, not only is the simple locking of the coupling units possible by means of the locking collars, but simultaneously optimum relative motion between the two coupling parts for bringing together and moving apart the coupling units becomes possible through known engagement slots and pins.

In this way, after the complete insertion of the plug-in parts into the sockets, there is the ability through further movement of the operating elements to create relative motion between one coupling part and the switch plate in order to thus displace the locking collar into the locked position or to limit the range of motion of the locking collar so much that the coupling units cannot disengage, especially such that mutual ball locking between the plug and socket cannot be overcome.

Because the switch plate can move independent of the locking collars, it is always guaranteed that first it is completely coupled and only then can the locking collars be displaced. In contrast, in the configuration from AT-E-84864 (=EP 0390715A1), the locking collars are fixed on the switch plate and taken along during the movement of the switch plate. In the multicoupling according to the invention, the operating element is mounted on the switch plate. Therefore, the switch plate can move independent of the locking collars.

For further securing of the coupling device in the closed position, thus when the lines and the coupling units are under high pressure, it is proposed that the two coupling parts can be locked automatically in the closed position through additional locking elements. In this way, a coupling device that is possibly still pressurized cannot be easily opened unintentionally through adjustment of the operating elements.

In connection with this, it is advantageous when the additional locking elements are embodied as spring-loaded latching, automatically locking clips, pins, bars, or the like. An automatic, additional locking of the coupling parts is then realized when the multicoupling device is being closed, even if the subsequent pressure build-up does not act on these coupling parts.

It is then especially advantageous when the clips, pins, bars, or the like can be brought by hand into the released position. Therefore, first this additional locking clip always must be disengaged intentionally before the multicoupling device can be opened.

In a special configuration, it is proposed that the locking element in the form of a spring-loaded pin is allocated to the activation lever and latches behind a catch ramp in the closed coupling device, with this spring-loaded pin being able to be disengaged by a push-button formed at the free end of the activation lever. Therefore, an operator must first disengage an additional locking element in advance, but the opening itself can be realized with one hand. Thus, the upper coupling part can be held with the other hand, without which this part could not fall down by itself in a corresponding position.

Through the special construction, a simple mutual alignment of the coupling parts and thus the coupling units also becomes possible. Here, it is especially advantageous when the coupling parts and the switch plate are guided so that they can be displaced along a common guide tube passing through these parts in the center region of these parts.

For simple handling of the multicoupling device according to the invention, it is further of particular advantage if an activation lever connects to one or to two ends of the shaft or to two shaft stumps. Therefore, despite the overcoming of the spring forces, simple and secure closing and opening of the multicoupling device is guaranteed.

In order to achieve good force distribution and to prevent jamming, it is advantageous if operating elements are placed on two ends of the shaft or on two shaft stumps.

In this way, one configuration is possible, in which the operating elements placed on the two ends of the shaft or in the region of the two shaft stumps have activation levers, whose free ends are connected to each other by means of a handle. This also guarantees good handling.

It is further also possible that operating elements with engagement slots are arranged on two ends of the continuous shaft, with an activation lever being embodied only on one operating element arranged on one side. The force is then applied only by the activation lever arranged on one side.

For proper functioning of the locking collar in the closed position of the coupling units, it is of particular advantage when the switch plate is spring-loaded in the direction of the open position of the coupling units and/or the locking collars are spring-loaded in the direction of their locked position. Thus, for disengaging the locking collars, only the spring force of the switch plate and/or the locking collar must be overcome.

Another variant of the invention is that the operating element is formed by at least one switch connecting link arranged between the coupling parts. Then, no direct engagement can be realized from the outside. In this connection, bringing together and pressing apart the coupling parts electrically, pneumatically, or hydraulically is also possible.

An advantageous configuration lies just in the arrangement of a switch connecting link in the interior of the coupling device, such that the switch connecting link provided in the inner region between the coupling parts is formed by a operating element held on the shaft and a pin held on the other coupling part. In this way, a special structural embodiment is provided, in that the operating element lies in a slot of the guide tube and is rotationally fixed to the shaft and the pin interacting with the operating element is inserted into a slot of the guide pin. The operating element or elements are therefore protected so that they cannot be directly affected from the outside, which is an essential advantage for operation in extreme installation sites.

A special structural configuration is that bearing sleeves for the shaft or the shaft stumps are provided on two opposite edges of the switch plate, wherein these bearing sleeves project past the edges of the switch plate and engage in longitudinal holes in the wall parts of one coupling part and thus can be displaced in these holes perpendicular to the shaft. Thus, optimum bearing of the shaft for the operating elements is possible and furthermore, the mutual guidance and relative displacement between switch plate and one coupling part is also realized without disruption.

For simple handling before the closing and before the removal of the other coupling part in the multicoupling device, it is advantageous when handles for lifting and for transport are arranged on at least one of the coupling parts at two opposite boundaries.

BRIEF DESCRIPTION OF THE DRAWINGS

Additional features and special advantages according to the invention are explained in more detail in the following description with reference to the drawings. Shown are:

FIG. 1 a perspective view of a multicoupling device;

FIG. 2 a side view of the multicoupling device;

FIG. 3 a plan view;

FIG. 4 a section along the line IV-IV in FIG. 3;

FIG. 5 a section along the line V-V in FIG. 3;

FIG. 6 a section along the line VI-VI in FIG. 3;

FIG. 7 an enlarged detail view VII in FIG. 6;

FIG. 8 an enlarged section along the line VIII-VIII in FIG. 6 through a partial region, with the coupling units being shown in the opened state;

FIG. 9 an enlarged section along the line VIII-VIII in FIG. 6 through a partial region, with the coupling parts being shown in the closed state.

DETAILED DESCRIPTION OF THE PREFERRED EMBODIMENTS

Here, a multicoupling device is described for lines, especially hydraulic lines, comprising coupling units 1 to 4, which are provided in a number corresponding to the number of connections to be produced. Each of these coupling units 1 to 4 has a plug 5 and a socket 6 that receives the plug 5, with the plugs 5 being connected rigidly to a first coupling part 7 and the sockets 6 being connected rigidly to a second coupling part 8. The coupling units 1 to 4 are embodied as self-locking snap couplings, whose sockets 6 each have a locking collar 9 that can be displaced in relation to the socket 6. The two coupling parts 7 and 8 can be brought together by means of operating elements 10 and can be pressed apart, with these parts being able to be fixed relative to each other in the coupling position.

In the illustrated embodiment, four coupling units 1 to 4 are shown, which are connected to the two coupling parts 7 and 8 and which therefore can be closed and opened simultaneously. In the scope of the invention, it is also possible to provide only one or two such coupling units or else also a corresponding multiple of such coupling units. Here, it is not important whether equal-sized coupling units 1 to 4 are provided or whether the units have various different sizes. Only small structural measures are necessary, which have the effect of enabling a common closing and opening process. One of these measures can be that the plugs 5 and/or the sockets 6 are mounted in various positions in relation to the coupling parts 7 and 8.

The locking collars 9 of the corresponding coupling unit 1 to 4 interact with a switch plate 11, which is common for all of the coupling units 1 to 4 and which lies between the two coupling parts 7 and 8. The operating element 10 is held on the switch plate 11 so that it can rotate about an axis 12 running parallel to the plane of this switch plate 11. Here, the switch plate can be adjusted relative to one coupling part 8 in the closing and opening direction of the coupling units 1 to 4. The two coupling parts 7 and 8 can be moved relative to each other by the operating elements 10 mounted on the switch plate 11 with engagement via curved engagement slots 13 and pins 14 protruding on the other coupling part 7 into a closed and an open position and can be mutually locked in its closed position.

The two coupling parts 7 and 8 can be locked automatically in the closed position by additional locking elements 15. These additional locking elements 15 are advantageously embodied as spring-loaded latching, automatically locking clips, pins, bars, or the like and furthermore can be brought into the released position by hand analogously. Naturally, other safety precautions are possible. Indeed, even such a simple construction appears to offer maximum security in order to prevent unauthorized or unintentional attempts at opening a pressurized multicoupling device.

The centering and thus the common alignment of the two coupling parts 7 and 8 can be performed using various means and methods. A very simple construction is implemented in the embodiment. The coupling parts 7 and 8 and the switch plate 11 are here guided by a common guide tube 16 located in a center region and a guide pin 17. The guide pin 17 is embodied here with a longitudinal slot for passing through a shaft 18 perpendicular to this pin.

The axis 12 for receiving the operating elements 10 is formed by a shaft 18 mounted in the switch plate 11 or by shaft stumps. The arrangement of a continuous shaft 18 guarantees the greatest security for the equivalent closing and opening of the coupling units 1 to 4, because jamming during the closing and opening motion is practically excluded through the synchronization of the operating elements 10.

The shaft 18 engages in an elongated hole 19 in a wall part 20 of one coupling part 6 in the region between the switch plate 11 and the operating elements 10.

In a special structural configuration, bearing sleeves 22 for the shaft 18 or the shaft stumps are provided on two opposite edges of the switch plate 11. These bearing sleeves 22 project past the edges of the switch plate 11 and engage in the elongated holes 19 in the wall parts 20 of one coupling part 6, so that the switch plate 11 is guided so that the sleeves can move in the wall parts 20 perpendicular to the axis 12.

Then the operating elements 10 are placed on two ends of the shaft 18 or on two shaft stumps. These operating elements 10 placed on the two ends of the shaft 18 or in the region of the two shaft stumps each have an activation lever 21, whose free ends can be connected to each other via a handle. However, in the arrangement of a continuous shaft 18, operating elements 10 with engagement slots 13 can also be arranged on two ends of the continuous shaft 18, with an activation lever 21 being formed on only one operating element 10 arranged on one side. Nevertheless, due to the continuous shaft 18, synchronous movement is guaranteed.

For optimum functioning of the multicoupling device, the switch plate 11 is spring-loaded in the direction towards the open position of the coupling units 1 to 4 and/or the locking collars 9 are spring-loaded in the direction of their locked position.

Instead of the operating elements 10 lying laterally on the outside, at least one switch connecting link can also be provided between the coupling parts 7 and 8 (not shown). In a multicoupling device with four coupling units 1 to 4, for example, a single switch connecting link can be provided in the center between the four coupling units 1 to 4. Then, if, for example, six or more such coupling units are housed in common in one coupling device, there is the ability to form two or more units as two switch connecting links, which then, however, could still be activated by a common shaft 18 from the outside.

In one such construction, the switch connecting link provided in the inner region between the coupling parts 7 and 8 is formed by an operating element 10 held on the shaft 18 and a pin (corresponding to the pin 14) held on the other coupling part 7. Here, the operating element 10 is rotationally fixed to the shaft 18. The pin 14 interacts with the operating element 10. In one such construction, the guide pin 17 has two crossing longitudinal slots. First, one slot is provided in order to be able to shift the guide pin 17 over the shaft 18 passing through the guide tube 16. Second, one slot is provided, in which the operating element can rotate in a guided way and can capture the pin 14 arranged in this slot. In a construction of this type, an additional variant can be provided, which can provide for a secure locking of the coupling units 1 to 4. Here, the locking with the operating element and the pin can be selected so that before the direct mutual end position of the coupling units, the guide pin 17 can be pushed no farther into the guide tube 16. Here, a spring element—for example, in the form of a disk spring or a disk-spring assembly—can be allocated to the guide pin 17, so that the guide pin 17 is lifted somewhat against the force of the spring element for a completely closed coupling device. Therefore, the coupling units 1 to 4 are pressed in a spring-loaded way in the closing direction.

For simpler handling, handles 23 for lifting and for transport are arranged on two opposite boundaries on at least one of the coupling parts 7 and 8.

The sequence of a closing process and in a similar way of an opening process of the multicoupling device will be explained in particular with reference to FIGS. 8 and 9. Immediately after placing the coupling part 7 with the plugs 5 on the coupling part 8 with the sockets 6 and the locking collars 9 and the integrated switch plate 11, the parts are in a position, like the one seen in FIG. 8. The locking collar 9 is in a position, in which the balls 24, 25 (see FIG. 9) provided for locking can move out into the groove 26 in the locking collar 9. Thus, the position after the multicoupling device is opened is shown here. In this position, at the beginning of a closing process, the plug 5 can penetrate into the socket 6, because the locking balls can move outwards.

In the closing process, through movement of the activation lever 21, the operating elements 10 are turned about the axis 12. The operating elements 10 here catch the pin 14 on the other coupling part 7 via the insertion slot 13, so that the coupling parts 7 and 8 are moved out relative to each other, namely until the coupling units 1 to 4 (plugs 5 and sockets 6) are completely closed. Now, the locking collar could also be displaced, because the balls 24, 25 provided for locking can penetrate into the corresponding openings 27, 28 at the front end region of the plug 5.

As soon as this first closed position is reached, through further movement of the activation lever, the switch plate 11 is displaced against a spring force relative to the coupling part 8. This is achieved smoothly, because the switch plate 11 or the shaft 18 engages in an elongated hole 19 in the coupling part 8. The locking collar 9 can therefore be led from the open position into a locked position, because a corresponding range of motion is smoothly released. Thus, a kind of annular gap 28 is formed, with the locking collar 9 on the socket 6 being able to be displaced by the axial length of this annular gap 28, with the locking collar preferably being held spring-loaded in this locked position for this purpose.

As an additional securing device, here the locking element 15 still latches, so that overall a coupling device is created, which is held closed independent of pressure in the lines and the coupling units without special loading on the operating elements 10, wherein the opening is then also still secured.

If now the multicoupling device is to be disengaged (opened), naturally first the locking element 15 must be disengaged. Then the locked position of the locking collar 9 is released. This is achieved simply through movement of the activation lever in the other direction of rotation. Thus, first the returning relative motion of the switch plate 11 is realized, with the surface 30 of the switch plate being pressed against the one end 31 of the locking collar 9 and this moving in the direction towards the open position. When the locking collar 9 has been displaced so far that the groove 26 lies at the level of the locking balls 24, 25 and when the activation lever 21 is moved farther, only then are the two coupling parts 7 and 8 moved apart. In this position, the shaft 18 or the bearing sleeves 22 are also in a position on the other end of the elongated hole 19. Since the balls 24, 25 can now move outwards from the locking position between the plug 5 and socket 6 into the position between the socket 6 and the locking collar 9, the connection of the coupling units 1 to 4 can be disengaged. The individual elements are then shown back in the position as in FIG. 8.

For the configuration of the locking element 15, various embodiments are possible. Thus, this locking element can be allocated to the activation lever 21, for example, in the form of a spring-loaded pin. This spring-loaded pin can then be latched behind a catch ramp—which is formed, for example, on the outer surface of the wall part 20—for a closed coupling device. For disengaging this spring-loaded pin, a corresponding push-button can be formed on the free end of the activation lever 21. Also, any other disengaging parts are possible, which can undo the latching by the pin.

As another configuration, it should be mentioned that a sort of visual inspection would be possible in order to determine that all of the coupling units are also actually closed. For this purpose, pins interacting with the locking collars can be provided, which meet spring-loaded pins arranged correspondingly on the other coupling part in the closed state of the coupling units. If the coupling units 1 to 4 have been closed properly and thus the locking collars 9 are in the locked position, then the spring-loaded pins are pushed past the surface of the coupling part 7, so that it can be determined by eye whether all of the coupling units have been closed properly or whether possibly one or more of these units are not yet closed. Therefore, before pressure build-up, an up-to-date inspection and closing process can be performed again.

Within the scope of the invention, various structural modifications are possible without abandoning the essential inventive features. With the multicoupling device according to the invention, a configuration can be designed, which brings along optimum possibilities also for operation in otherwise interruption-susceptible installation sites but also in industry.

The invention claimed is:

1. Multicoupling device for lines, comprising coupling units (1-4), which are provided in a number corresponding to a number of connections to be produced and which each have a plug and a socket that receives the plug, and with first and second coupling parts (7, 8), wherein the plug is fixed to one of the coupling parts and the socket of a corresponding coupling unit is fixed on the other of the coupling parts, wherein the coupling units are embodied as self-locking snap couplings, the sockets each have a locking collar (9), which can be displaced in relation to the socket, wherein the two coupling parts can be brought together and pressed apart by means of operating elements and can be fixed relative to each other in the coupling position, wherein the locking collars (9) of the corresponding coupling units (1-4) interact with a switch plate (11), which is common for all of the coupling units (1-4) and which lies between the two coupling parts (7, 8), wherein the switch plate (11) can be adjusted relative to the first coupling part (7) in a closing and opening direction of the coupling units (1-4), and wherein the two coupling parts (7, 8) can be moved relative to each other by at least one operating element (10) mounted on the switch plate (11) with engagement via at least one curved engagement slot (13) and a pin (14) formed on the first coupling part (7) into closed and open positions and can be mutually locked in the closed position, the operating element (10) is held on the switch plate (11) so that it can rotate about an axis (12) that extends parallel to a plane of the switch plate (11); the axis (12) for receiving the operating element (10) is formed by a shaft mounted in the switch plate (11) or by two shaft stumps; the shaft (18) engages in an elongated hole (19) in a wall part (20) of the second coupling part (8) in a region between the switch plate (11) and the operating element (10); and the switch plate (11) can move independent of the locking collars (9).

2. Multicoupling device according to claim 1, wherein the two coupling parts (7, 8) can be automatically locked in the closed position by additional locking elements (15).

3. Multicoupling device according to claim 2, wherein the additional locking elements (15) are embodied as spring-loaded latching, automatically locking clips, pins, or bars.

4. Multicoupling device according to claim 3, characterized in that the clips, pins, or bars, can be brought into a released position by hand.

5. Multicoupling device according to claim 1, wherein the coupling parts (7, 8) and the switch plate (11) are guided by a common guide tube (16) located in a center region.

6. Multicoupling device according to claim 5, wherein the operating element (10) is rotationally fixed to the shaft (18), and the pin (14) interacts with the operating element (10).

7. Multicoupling device according to claim 1, wherein an activation lever (21) is attached to one or to both ends of the shaft (18) or to the two shaft stumps.

8. Multicoupling device according to claim 1, wherein the at least one operating element (10) is placed on each of two ends of the shaft (18) or on the two shaft stumps.

9. Multicoupling device according to claim 1, wherein the at least one operating element (10) includes engagement slots (13) and is arranged on two ends of the shaft (18), and an activation lever (21) is formed on only one operating element (10) arranged on one side.

10. Multicoupling device according to claim 1, wherein the switch plate (11) is spring-loaded in a direction towards the open position of the coupling units (1-4) and/or the locking collars (9) are spring-loaded in a direction of their locked position.

11. Multicoupling device according to claim 1, wherein a switch connecting link provided in an inner region between the coupling parts (7, 8) is formed by the operating element held on the shaft (18) and a pin held on the first coupling part (7).

12. Multicoupling device according to claim 1, wherein bearing sleeves (22) for the shaft (18) or the shaft stumps are provided on two opposing edges of the switch plate (11), the bearing sleeves (22) project past edges of the switch plate (11) and engage in elongated holes (19) in wall parts (20) of the second coupling part (8) and thus are guided so that they can move in the holes perpendicular to the axis (12).

13. Multicoupling device according to claim 1, wherein handles (24) for lifting and for transport are arranged on at least one of the coupling parts (7, 8) on two opposite sides.

* * * * *